US006990706B2

(12) United States Patent
Broecker et al.

(10) Patent No.: US 6,990,706 B2

(45) Date of Patent: Jan. 31, 2006

(54) TOOTHBRUSH

(75) Inventors: Gerd Broecker, Neustadt (DE); Matthias Georgi, Buehl (DE); Berthold Meyer, Neustadt (DE); Wolf-Dieter Müller, Buehl (DE)

(73) Assignees: GlaxoSmithKline Consumer Healthcare GmbH & Co KG, Buehl (DE); M&C Schiffer GmbH, Neustadt (DE)

(*) Notice: Subject to any disclaimer, the term of this patent is extended or adjusted under 35 U.S.C. 154(b) by 498 days.

(21) Appl. No.: 10/149,796

(22) PCT Filed: Nov. 30, 2000

(86) PCT No.: PCT/EP00/12080

§ 371 (c)(1), (2), (4) Date: Oct. 16, 2002

(87) PCT Pub. No.: WO01/43580

PCT Pub. Date: Jun. 21, 2001

(65) Prior Publication Data

US 2003/0056311 A1 Mar. 27, 2003

(30) Foreign Application Priority Data

Dec. 14, 1999 (GB) .................................... 9929402

(51) Int. Cl.
*A46B 9/04* (2006.01)

(52) U.S. Cl. ...................... 15/167.1; 15/144.1; 15/172; 15/143.1; 15/201

(58) Field of Classification Search ............... 15/167.1, 15/144.1, 143.1, 201, 167.2, 172
See application file for complete search history.

(56) References Cited

U.S. PATENT DOCUMENTS

| | | | | | |
|---|---|---|---|---|---|
| 3,493,991 | A | * | 2/1970 | De Bianchi | 15/143.1 |
| 5,054,154 | A | * | 10/1991 | Schiffer et al. | 15/167.1 |
| 5,315,732 | A | * | 5/1994 | Huefner et al. | 15/167.1 |
| 6,101,659 | A | * | 8/2000 | Halm | 15/167.1 |

FOREIGN PATENT DOCUMENTS

| | | | |
|---|---|---|---|
| DE | 39 23 495 | C | 1/1991 |
| EP | 0 336 641 | A | 10/1989 |
| WO | WO 95 10959 | A | 4/1995 |
| WO | WO 00 30493 | A | 6/2000 |

* cited by examiner

*Primary Examiner*—John Kim
*Assistant Examiner*—Shay L. Balsis
(74) *Attorney, Agent, or Firm*—Nora Stein-Fernandez; Theodore R. Furman

(57) ABSTRACT

A toothbrush having a head which carries a dental cleaning tool, and a grip handle, the head and handle being disposed along a longitudinal head-handle axis, the toothbrush having a resiliently flexible structure which can resiliently bend under the action of toothbrushing pressure and having adjustment means comprising a longitudinally moveable stiffening member which can be moved longitudinally into greater or lesser engagement with the resiliently flexible structure.

10 Claims, 7 Drawing Sheets

10
11
12
13
14
15
16
17
18
19
111
112
114
A
B
C

A
A
c
c
B
20
21
22
23
24
25
26
27
28
29
210
211
212

TOOTHBRUSH

BACKGROUND OF THE INVENTION

This invention relates to dental cleaning implements, especially in particular to toothbrushes having a resiliently flexible region in their structure, particularly having such a structure situated in their handle or between their head and their handle.

Toothbrushes generally comprise a head carrying a dental cleaning tool, normally a cluster of bristles in a toothbrush, and a grip handle, arranged along a longitudinal head-handle axis. Often there is a thinned neck region between the head and the part of the handle which is gripped by the user during use. It is known to incorporate a resiliently flexible region in the handle or between the head and the handle to help to relieve excessive pressure from being applied to the teeth or other mouth tissues of the user during implementing. Examples of such resiliently flexible regions in toothbrushes are disclosed in EP 0 0336 641A and DE 39 234 95.

Different users of toothbrushes may prefer or need toothbrushes having different degrees of resilient flexibility of such a region. At present the user has no option except to purchase a complete different implement having a selected degree of flexibility of such a region. WO 95/10959 discloses a toothbrush having a modification of a two-part slideable finger grip to reinforce and alter the flexibility of the handle section as required by the user. U.S. Pat. No. 5,315,732 discloses a toothbrush having a flexible part between its head and handle in the form of two parallel flexible springs between which a rigid piston may be driven by the user to adjust the flexibility.

BRIEF SUMMARY OF THE INVENTION

It is an object of this invention to provide a dental cleaning implement particularly a toothbrush having a resiliently flexible region in its structure wherein the resilience and/or flexibility of the region may be altered by the user.

According to this invention a dental cleaning implement has a head which carries a dental cleaning tool, and a grip handle, the head and handle being along a longitudinal head-handle direction, the implement has a resiliently flexible structure situated in its handle or between its head and its handle, which can resiliently bend under the action of pressure experienced by the head during toothbrushing, and the implement has adjustment means by which the user may alter the flexibility of the structure between less and more flexible, the adjustment means comprising a longitudinally moveable stiffening member which can be moved longitudinally into greater or lesser engagement with the resiliently flexible structure.

The dental cleaning implement may preferably be a toothbrush having a dental cleaning tool which comprises a cluster of bristles projecting from the head in the manner of a conventional toothbrush, or alternatively may comprise a dental flossing tool.

DETAILED DESCRIPTION OF INVENTION

By "lesser engagement" herein is included the possibility that the stiffening member is not engaged at all with the structure, such that movement into "greater engagement" can include the possibility that the stiffening member moves from a position of non-engagement to a position in which it is wholly or partly engaged with the structure.

By "flexible" herein is meant primarily displacing in a direction perpendicular to the longitudinal axis under the action of pressure applied to the head in a direction perpendicular to the longitudinal axis. By "less flexible" herein is meant primarily that for a unit of pressure the structure displaces less than a "more flexible" structure, or that more pressure is required to cause a unit of displacement than is required for a "more flexible" structure. The principal mode of displacement of such a flexible structure is a bending of the flexible structure.

By "resilient" herein is meant primarily that upon release of the above-mentioned pressure the resilient structure returns rapidly back to the position it had before the pressure was applied, in the manner of a spring.

The combination of the flexible structure and the stiffening member when the stiffening member is more engaged with the structure is less flexible than the combination when the stiffening member is less engaged with the flexible structure, for example when the stiffening member is not engaged at all with the flexible structure.

In one embodiment the stiffening member may be mounted externally on the flexible structure, or on the handle, or on the neck of the toothbrush longitudinally adjacent to the flexible structure, particularly on the handle between the flexible structure and the end of the handle longitudinally remote from the head. Such an externally mounted stiffening member may move along the external surface of the toothbrush.

For example the flexible structure, and preferably the handle of the toothbrush, particularly a part of the handle longitudinally adjacent to the flexible part, may have one or more guide with which the stiffening member may engage and which can guide the stiffening member in its longitudinal movement. Such a guide may comprise a longitudinal groove, ledge, or rail etc in the external surface of the flexible structure and/or handle. Additionally or alternatively the flexible structure and/or handle may have one or more internal guide, e.g. a longitudinally extending slot, with which the stiffening member can engage.

The stiffening member may have one or more part which can engage with the one or more guide and which can ride longitudinally along the one or more guide. The stiffening member may be moveable longitudinally along the guide into greater or lesser engagement with the resiliently flexible structure.

For example the stiffening member may wholly or partly surround the flexible structure or the handle or neck of the toothbrush adjacent to the flexible structure in the manner of a whole or partial sleeve or "saddle" which is moveable on the flexible structure, handle or neck.

The stiffening member may for example comprise one or more longitudinally extending arm, e.g. extending in the direction toward the head of the toothbrush, which can engage with the flexible structure.

In another embodiment the stiffening member may be moveable internally within the flexible structure. For example the flexible structure may have a longitudinally extending internal channel along which the stiffening member may move within the structure. This channel may continue into, or connect with another channel in, the adjacent part of the handle or neck of the toothbrush.

The stiffening member is provided with means to enable it to be moved longitudinally into greater or lesser engagement with the resiliently flexible structure.

In one embodiment the stiffening member may be longitudinally slideable in relation to the flexible structure. The stiffening member may be retained moveably, e.g. slideably on the toothbrush by for example a snap fit engagement with the handle, neck or flexible structure. For example there may be a longitudinally slideable stiffening member on each side of the toothbrush, these members being linked together to enable them to move together slideably along the toothbrush. For example there may be a link between these members and a longitudinal guide slot passing through the toothbrush and along which this guide may run.

In another embodiment the stiffening member may be longitudinally moveable by a whole or partial screw thread type action e.g. by a rotatable part having such a thread operating upon a thread on the stiffening member. Alternative means for making the stiffening member longitudinally moveable will be apparent to those skilled in the art.

For example when the stiffening member is mounted externally on the toothbrush the user may easily move it by a hand or finger action. When the stiffening member is moveable internally it may be necessary to expose part of the stiffening member outside of the channel, or provide it with an externally extending handle which enables the user to move it longitudinally. Alternatively an internal stiffening member may be provided with a driver, e.g. with a screw thread means which can be rotated to screw the stiffening member longitudinally along the toothbrush.

In one embodiment the flexible structure may comprise a region of "U" or "V" shaped folds in the material of the toothbrush, two longitudinally adjacent back-to-back "U" or "V" folds forming respectively an "S" or "Z" shaped folded region. Such a structure is for example disclosed in EP 0 336 641A. Each of such folds typically comprises a pair of limbs which meet to define the "U" or "V" shape, with a fold axis at the meeting of the limbs and extending in projection out of the plane in which the "U" or "V" shape lies. Such a flexible region may taper in Another flexible structure comprises a composite region of one or more relatively more flexible elastomer parts and one or more relatively less flexible plastic material parts such that the structure may for example be constructed more or less flexible by an appropriate selection of plastic and elastomer materials and parts.

An example of such a composite flexible structure comprises a region of "U" or "V" shaped folds in the material of the toothbrush, two longitudinally adjacent back-to-back "U" or "V" folds forming respectively an "S" or "Z" shaped folded region as described above, with an elastomer material in the concavity or "bite" between the limbs of the folds. In such a construction the elastomer material between the folds may be compressed as the composite flexible structure bends and the limbs move toward each other. The elastomer material thereby resists the bending deformation of the flexible structure and the presence and amount of the elastomer material can be used to control the flexibility. The folds may be additionally linked by linking structures of the plastic material of the toothbrush, for example one or more integral longitudinal linking rib between the limbs of the folds.

Other kinds of flexible structures comprise thin regions of plastic material in the handle or between the head and the handle such as a thin, longitudinally extending, plastic material neck between the head and the handle. For example such a structure may be tubular having the above-described internal conduit.

Suitably the flexible structure may be preferentially flexible in certain directions. For example if the dental cleaning tool comprises a cluster of bristles extending generally in a bristle direction perpendicular to the longitudinal axis the flexible structure may be preferentially flexible in the plane which includes the longitudinal axis and the bristle direction.

In a preferred embodiment, the resiliently flexible structure is a region of "U" shaped folds, such that pairs of longitudinally adjacent "U" shaped folds thereby form an "S" shaped fold, the fold axes of the folds being aligned perpendicular or at an acute angle to the longitudinal axis and to the bristle direction; preferably there is an elastomer material in the bite between the limbs of the folds; situated on the handle of the toothbrush is a longitudinally moveable slider; the flexible structure has one or more external guide, e.g. one or more longitudinally extending groove on each side; the stiffening member comprises one or more arm, preferably one on each side of the toothbrush, which extend longitudinally toward the toothbrush head when the slider is on the handle, and the one or more arm engages with the one or more guide when the slider is moved longitudinally toward the head.

The stiffening member in this last described embodiment is preferably moveable longitudinally between two extreme longitudinally displaced positions. In a first extreme position the slider is distanced from the head, in which position the stiffening member, e.g. the one or more arm, is not engaged or only engaged to a small extent with the flexible structure. In the second extreme position the slider is closer to the head, in which position the one or more arm engages more fully with the structure. In the second position the combination of the flexible structure engaged with the one or more arm is less flexible than the flexible structure without the one or more arm engaged.

For example in this embodiment progressive movement of the one or more arm toward the toothbrush head may cause the one or more arm to cross a progressively greater number of limbs of the "U" or "V" shaped fold, and to bridge a progressively greater number of the "bites" between adjacent limbs.

In another preferred embodiment the flexible structure may be a region of "U" shaped folds as above and is a hollow tubular structure, having an internal longitudinally extending internal channel, situated within which is an internal longitudinally moveable stiffening member, which has a part which can engage with and move longitudinally internally along the channel inside the flexible structure. The stiffening member may be moved within the channel between two extreme longitudinally displaced positions, at which the stiffening member is respectively to a lesser extent engaged with the flexible structure, and to a greater extent engaged with the flexible structure. As the stiffness of the structure is greater with the part more fully engaged than with the part less fully engaged with the flexible structure these extreme positions of the stiffening member provide more and less stiff states of the toothbrush.

The flexible structure, the stiffening member and other parts of the toothbrush of the present invention may be made of plastics and elastomer materials conventional in the art of toothbrush manufacture, as may other parts of the toothbrush such as the head, grip handle and the dental cleansing implement such as a cluster of nylon bristles or a dental flossing tool. The head may be replaceably attachable to the toothbrush handle.

The dental cleaning implement of the present invention may be made using conventional injection moulding technology and processes.

Accordingly in a further aspect the present invention provides an injection moulding process in which a dental cleaning implement and its component parts may be made.

Further the present invention provides a mould or set of moulds in which the dental cleaning implement of the present invention or its component parts may be made.

The invention will now be described by way of example only with reference to the accompanying drawings FIGS. 1–18 which show part cutaway and part sectioned views of toothbrushes of the present invention.

DETAILED DESCRIPTION OF THE INVENTION

Figures 1, 2, 3:
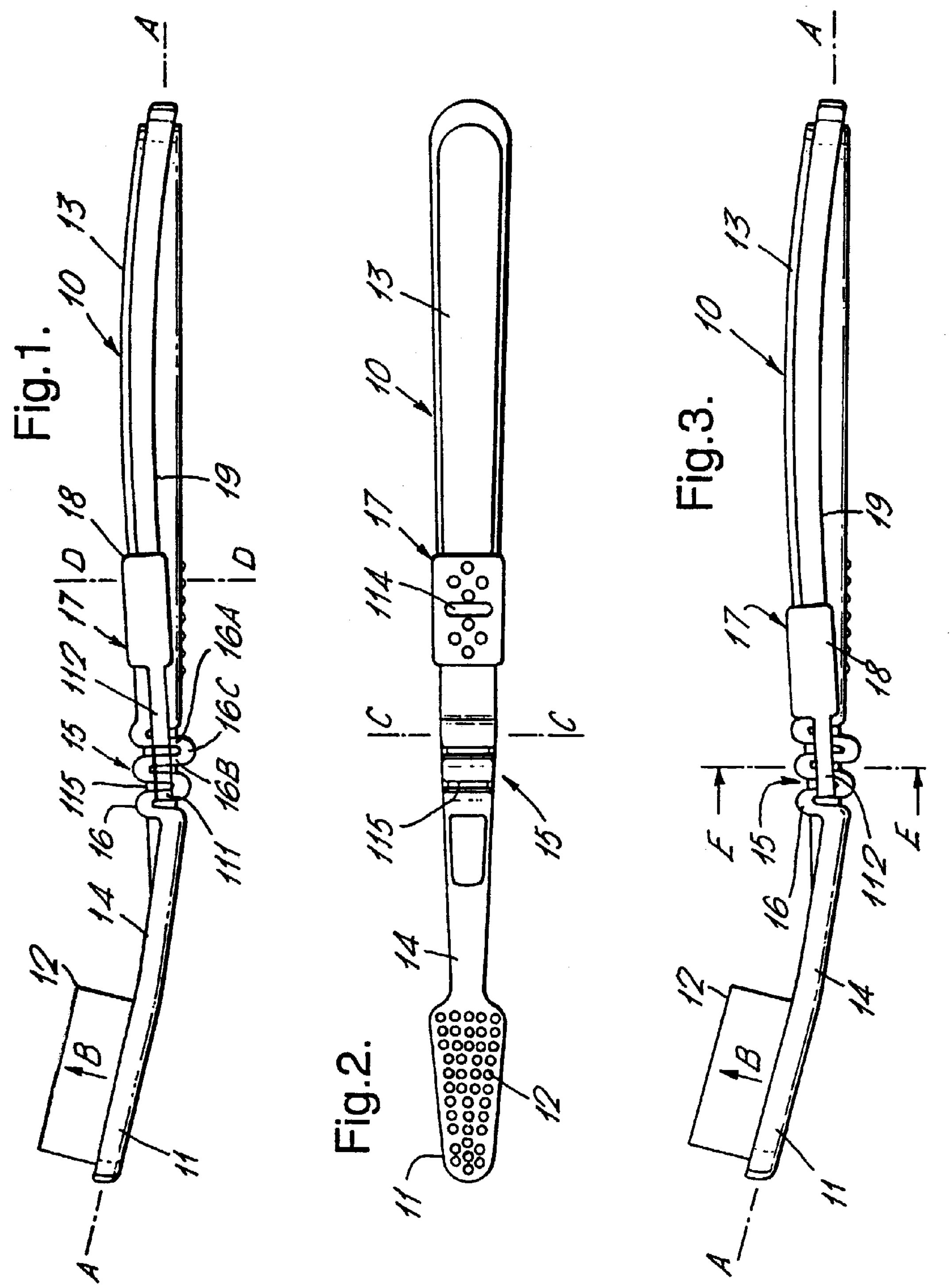
FIG. 1 is a side view of a toothbrush with a slider in one extreme position.
FIG. 2 is a top view of the toothbrush in FIG. 1.
FIG. 3 is a side view of the toothbrush with a slider in other extreme position.
Figures 4, 5, 6:
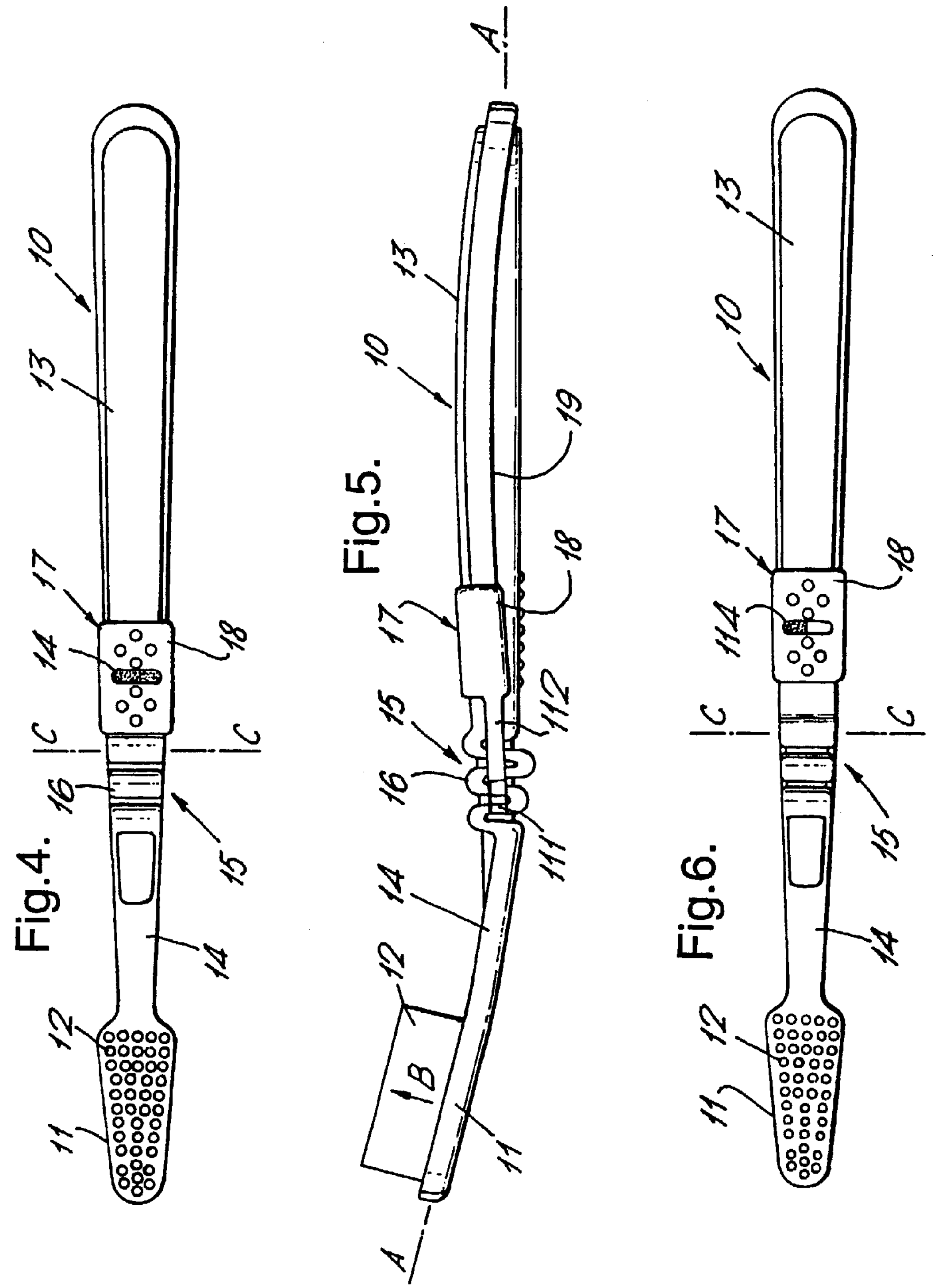
FIG. 4 is a top view of the toothbrush in FIG. 3.
FIG. 5 is a side view of the toothbrush with slider in an intermediate position.
FIG. 6 is a top view of the toothbrush in FIG. 5.

Referring to FIGS. 1 to 9 a toothbrush is shown 10 (overall) comprising a head 11, which carries a cluster of bristles 12 projecting from head 11 in a bristle direction B, a grip handle 13 and a thinned neck part 14, all being disposed along a longitudinal direction A—A. Located longitudinally between the head 11 and the grip handle 13 is a resiliently flexible structure 15 being a region of "U" shaped folds 16 of the plastics material of which the toothbrush is made, the fold axes C—C of the folds being aligned perpendicular to the longitudinal axis A—A and to the bristle direction B. In FIGS. 1, 3, and 5 the "U" shape of the folds 16 can be seen, each of the folds comprising a pair of limbs 16A, 16B which meet at 16C to define the "U" shape in the plane of the drawing, with the projected fold axis C—C extending out of the plane of the drawing. Pairs of longitudinally adjacent "U" shaped folds thereby form an "S" shaped fold.

Figure 7:
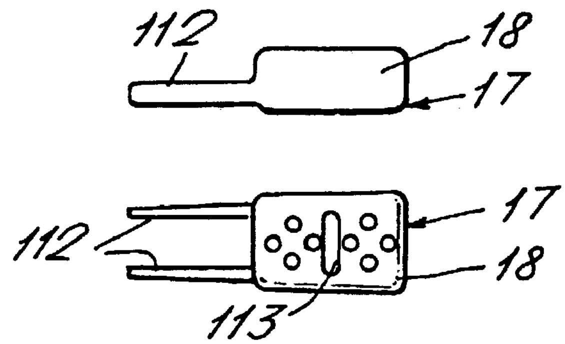
FIG. 7 is a top and side view of slider.
Figure 8:
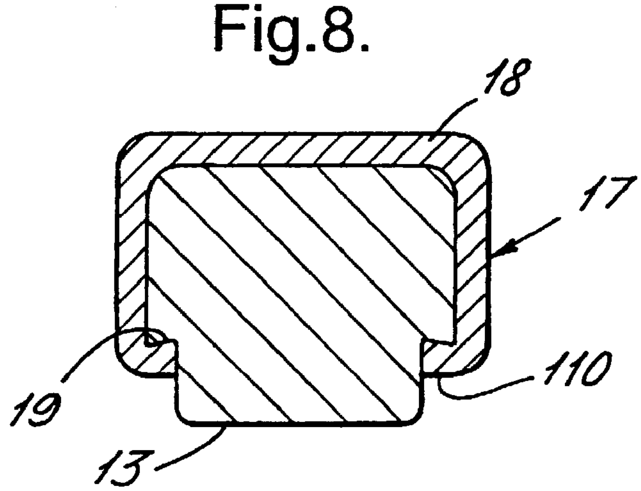
FIG. 8 is a cross-section of the toothbrush in FIG. 1 at D—D.
Figure 9:
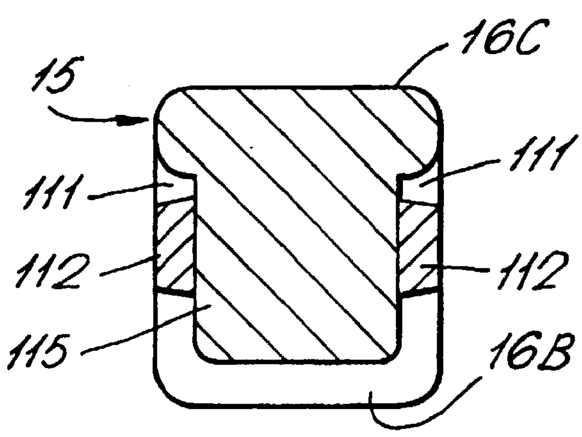
FIG. 9 is a cross-section of the toothbrush in FIG. 3 at E—E.

Situated on the handle 13 is a longitudinally moveable stiffening member 17 being a slider 18, shown more clearly in side and top views in FIG. 7, which is a part sleeve generally "C" shaped in cross section about the longitudinal direction A—A as shown more clearly in FIG. 8, which is a cross section at D—D in FIG. 1. The toothbrush handle 13 is provided externally with longitudinally extending guide ledges 19. The slider 18 can snap over the toothbrush grip handle 13 and be retained thereon by its resilience, and by the engagement of grip portions 110 of the slider 18 with the ledges 19.

The structure 15 has external longitudinally extending guide grooves 111 on each of its sides. The slider 18 has two arms 112 which extend longitudinally toward the toothbrush head 11 when the slider 18 is retained on the handle 13, and the arms 112 engage with the guide grooves 111 in the structure 15 when the slider 18 is in position retained on the handle 13, as shown in cross section in FIG. 9, which is a cross sectional view through the flexible region 15 at line E—E in FIG. 3 looking in the direction of the arrows.

The slider 18 is moveable longitudinally between two extreme longitudinally displaced positions. In one extreme position shown in FIGS. 1 and 2 the slider 18 is as distanced from the head 11 as it can be whilst retained on the handle 18. The handle 18 is provided with end-stop abutment surfaces, not shown, against which the slider 18 abuts when it is in this position and so that the slider 18 cannot move any further away from the head 11 or fall off the handle. In this position the arms 112 are only engaged to a small extent with the flexible structure 15, i.e. only extending via groove 111 across the "U" fold 16 which is closest to the handle 13.

In the other extreme position shown in FIGS. 3 and 4 the slider 18 is as close to the head 11 as it can be whilst retained on the handle 13. In this position the arms 112 engage more fully with the structure 15, i.e. extending as far as the "U" fold 16 closest to the head 11. The toothbrush handle 13 may be provided with end-stop abutment surfaces (not shown) to prevent the slider 18 from moving closer to the head 11.

A situation with the slider in an intermediate position is shown in FIGS. 5 and 6, where the arms 112 engage with the structure 15 as far as the longitudinal centre of the structure 15.

As the combination of the structure 15 with the arms 112 engaged with the grooves 111 is less flexible than the structure 15 without the engaged arms 112, the situation shown in FIGS. 1 and 2 is a less stiff structure, the situation shown in FIGS. 3 and 4 is a more stiff structure, and the situation shown in FIGS. 5 and 6 is a structure of intermediate stiffness. In the constructions shown in FIGS. 1–9, stiffness is determined as the resistance to bending under the influence of pressure applied to the head 11 in the direction of the arrow shown.

The slider 18 may be moved by the thumb of the user whilst holding the handle 13, and the slider may be provided with a window 113 which is open to differently indicated, e.g. differently coloured regions 114 on the handle 13 to give the user a visual indication of the position of the slider 18 which has been selected and of the consequent stiffness of the toothbrush.

Between the limbs of the folds 16 in the flexible region 15 of FIGS. 1–9 is a longitudinal strengthening rib 115 which is integral with the folds 15. The dimensions of the rib 115 can be selected to control the inherent flexibility of the region 15.

Figures 10, 11, 12:
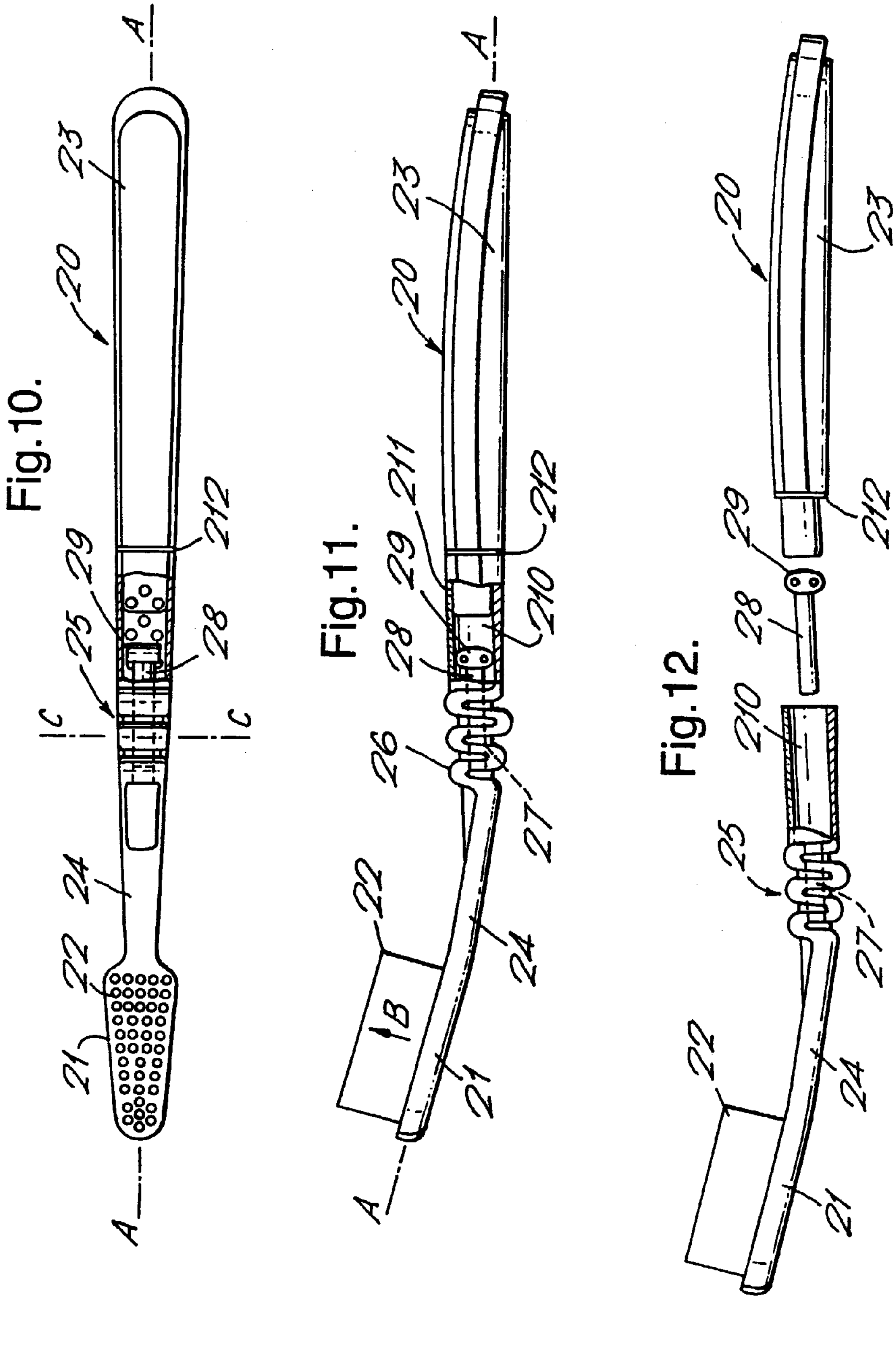
FIG. 10 is a top view of a second embodiment of a toothbrush with a slider.
FIG. 11 is a side view of the toothbrush in FIG. 10.
FIG. 12 is a broken down view of all the parts in FIG. 10.

Referring to FIGS. 10, 11 and 12 a toothbrush is shown overall 20 which comprises a head 21, which carries a cluster of bristles 22 projecting from head 21 in a bristle direction B, a grip handle 23 and a thinned neck part 24, all being disposed along a longitudinal direction A—A. located longitudinally between the head 21 and the grip handle 23 is a resiliently flexible structure 25 being a region of "U" shaped folds 26 of the plastics material of which the toothbrush is made, the fold axes C—C of the folds being aligned perpendicular to the longitudinal direction A—A and to the bristle direction B. Pairs of longitudinally adjacent "U" shaped folds thereby form an "S" shaped fold.

The structure 25 is a hollow tubular structure, having an internal longitudinally extending internal channel 27. Situated within the channel 27 is an internal longitudinally moveable slider 28. The slider 28 can engage with and move longitudinally internally along the flexible part 25 and has a handling button 29. The channel 27 extends into the handle at 210. The part 210 has a window 211 by which the user may move the slider 28 longitudinally within channel 27 using button 29 which is exposed through window 211 and through which the user can see the position of the slider 28.

The slider 28 may be moved within channel 27 between extreme longitudinally displaced positions. As shown in FIGS. 10 and 11, the slider 28 is at a position in which the part 29 is to a greater extent engaged within the structure 25 i.e. extending internally within structure 25 as far as the closest of the "U" folds 26 to the head 21. It will be apparent that by moving the slider 28 to the right of the position shown in FIGS. 10 and 11 the slider 28 becomes to a lesser extent engaged with the structure 25. The extent to which the part 29 is engaged with the structure 25 is visually indicated by the position of the part 210 in the window 211. As the stiffness (as defined with reference to FIG. 1) of the structure 25 is greater with the part 29 more fully engaged with the structure 25 than with the part 29 less fully engaged with the part 25, the extreme positions of the slider 28 represent more and less stiff states of the toothbrush 21.

In FIG. 12 a possible construction of the toothbrush shown in FIG. 10 is shown, in which the handle 23, and the integral combination of the head 21, neck 24 and flexible structure 25 are made separately, the slider 28 introduced and the toothbrush assembled. An elastomer washer 212 may be fitted between the assembled parts.

Figure 13:
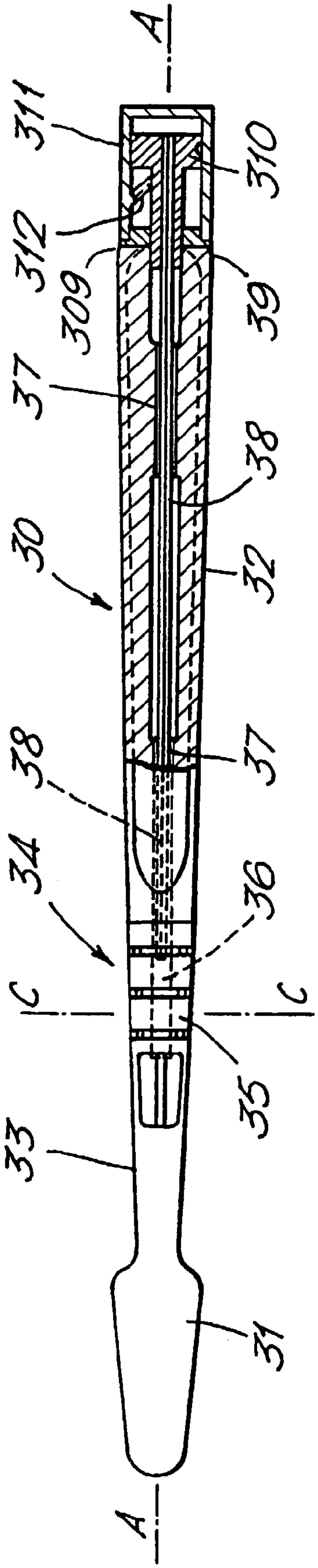
FIG. 13 is a partial cross-sectional view of a third embodiment of a toothbrush with a stiffening member.
Figure 14:
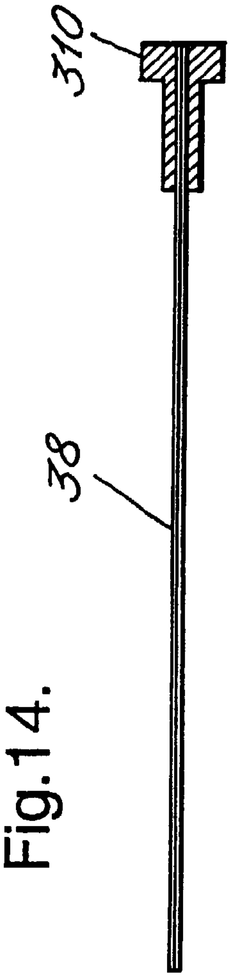
FIG. 14 is the stiffening member of FIG. 13.

Referring to FIGS. 13 and 14 a toothbrush is shown overall 30 which comprises a head 31, which carries a cluster of bristles (not shown) projecting from head 31, a grip handle 32 and a thinned neck part 33, all being disposed along a longitudinal axis direction A—A. Located longitudinally between the head 31 and the grip handle 32 is a resiliently flexible structure 34 being a region of "U" shaped folds 35 of the plastics material of which the toothbrush is made, the fold axes C—C of the folds being aligned perpendicular to the longitudinal axis A—A and to the bristle direction B. Pairs of longitudinally adjacent "U" shaped folds thereby form an "S" shaped fold.

The structure 34 is again a hollow tubular structure, having an internal longitudinally extending channel 36. In the structure shown in FIG. 13 the channel 36 extends as shown 37 to continue internally along the entire length of the handle 32. Situated internally within channel 36 is a longitudinally moveable stiffening member 38, the shape of which is shown more clearly in FIG. 14. At the end 39 of the handle 32 the stiffening member 38 terminates in a part 310 external to the handle 32 when the stiffening member 38 is within channel 36. The part 310 has a screw threaded external surface and is enclosed within a cap 311 which is rotatably mounted on handle 32 at end 309, and which includes an internal screw thread 312 which engages with the screw thread part 310. When the cap 311 is rotated on handle 32 the engagement of the screw thread 312 and part 310 causes the stiffening member 38 to be moved longitudinally along inside channel 36, the direction of longitudinal movement depending upon the direction of rotation of the cap 311.

In a manner analogous to that shown in and described with reference to FIGS. 10–12 the longitudinal movement of the stiffening member 38 within flexible structure 34, into greater (further to the left) and lesser (further to the right) engagement with the structure 34 allows the flexibility of the toothbrush 31 to be varied between more and less stiff states. Instead of the part 310 and rotatable cap 311 the stiffening member 38 may be provided with a push button (not shown) externally of the end 309 by means of which the stiffening member 38 may be pushed longitudinally along inside the channel 36.

Figure 15:
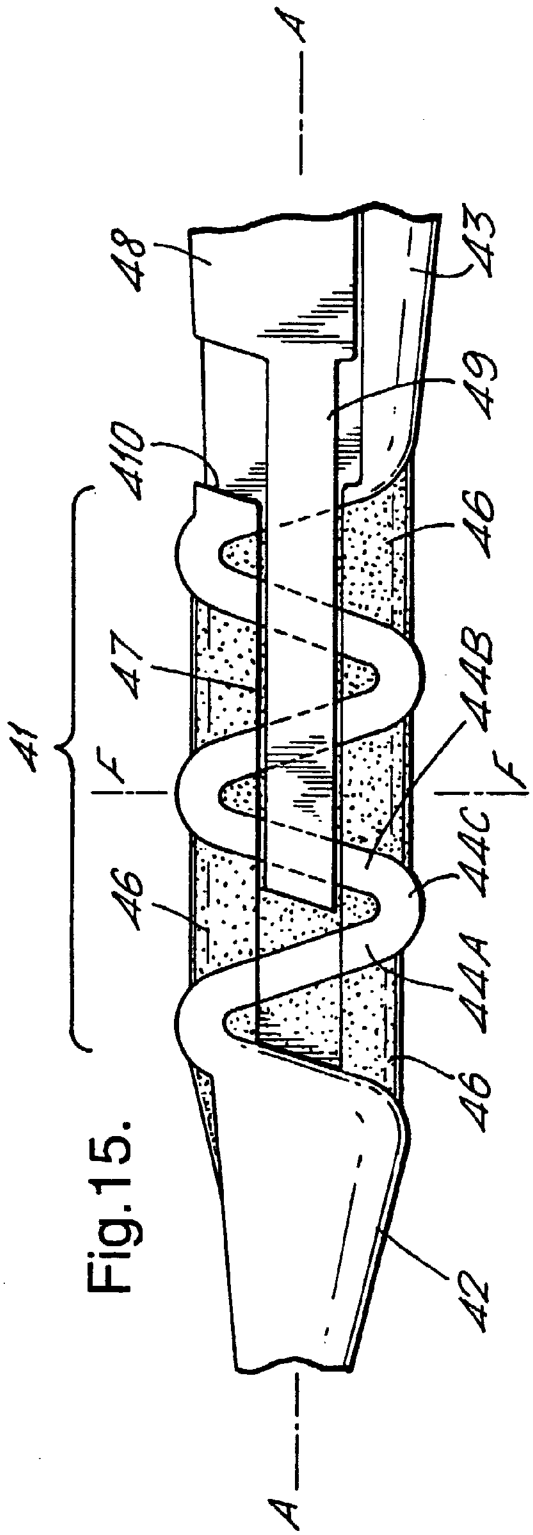
FIG. 15 is an enlarged side view of part of another flexible structure.
Figure 16:
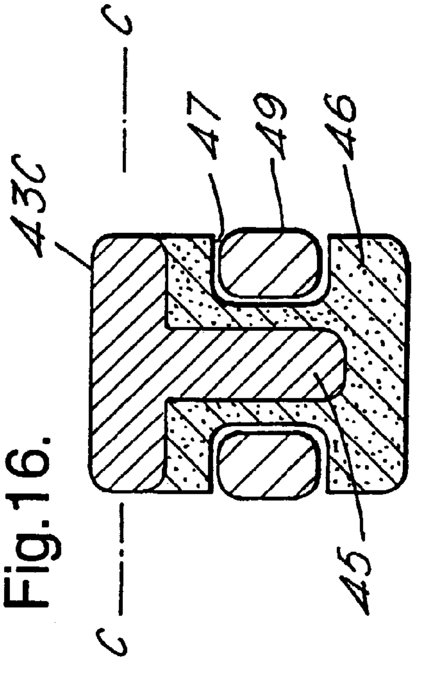
FIG. 16 is a cross-section of the toothbrush in FIG. 15 at F—F.

Referring to FIGS. 15 and 16 an enlarged side view of part of another flexible structure 41 (overall) of a toothbrush of this invention is shown. FIG. 16 is a cross section of FIG. 15 through line F—F. The flexible structure 41 is situated between the neck 42 and grip handle 43 of the toothbrush. The flexible structure 41 comprises a region of "V" shaped folds 44, similar to that shown in FIGS. 1–9, formed by longitudinally adjacent pairs of limbs 44A and 44B which meet at 44C, each aligned at an acute angle to the longitudinal direction A—A and to define an acute angled "V" shape between them with a fold axis C—C extending perpendicularly out of the plane of the drawing of FIG. 15. The folds 44 are longitudinally linked by an integral longitudinal rib 45. In the concavity or "bite" between the limbs 44A and 44B, and between the handle 43 and the limb nearest the handle, and between the neck 42 and the limb nearest the neck 42, is an elastomer material 46. As the region 41 bends under pressure experienced by the head of the toothbrush during toothbrushing the limbs 44A, 44B will compress the elastomer material 46 between them, and the elastomer material will thereby resiliently resist the bending of the region 41.

The limbs 44A, 44B and the elastomer material 46 have a longitudinal guide groove 47 on both sides of the region 41. A slider 48, similar in construction to that 17 shown in FIGS. 1–9 is slideably mounted on the handle 43, and has two arms 49 which are stiffening members which can engage with the flexible region 41 as the arms 49 are longitudinally moved along the grooves 47 in a manner analogous to that described with reference to FIGS. 1–9. End stop abutment surfaces 410 are present on the toothbrush handle 43 to limit the longitudinal movement of the slider 48 toward the head, and there are similar end-stop surfaces toward the other end of the toothbrush handle 43. The arms 49 can engage with the flexible region 41 to greater or lesser extents to adjust the flexibility in a manner analogous to FIGS. 1–9. The flexible region 41 may taper in its thickness in the bristle direction, becoming thinner closer to the head.

Figure 17:
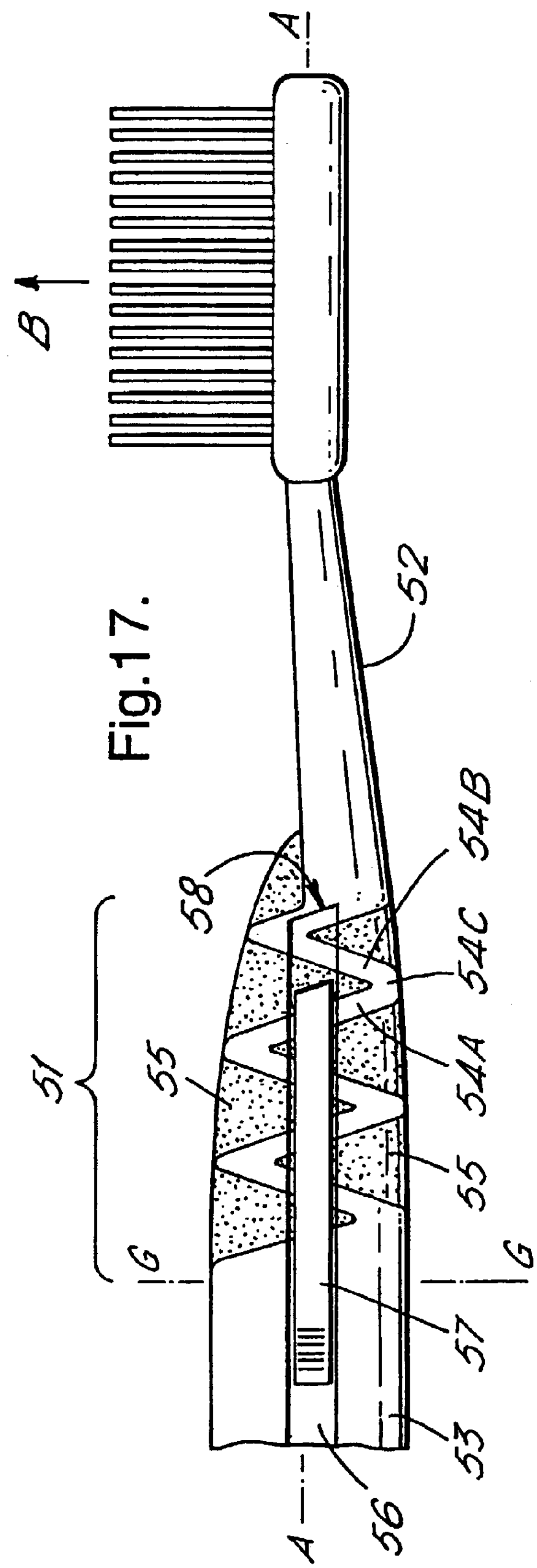
FIG. 17 is a side view of part of another flexible structure.

Referring to FIG. 17 a side view of part of another flexible structure 51 (overall) of a toothbrush of this invention is shown. The flexible structure 51 is situated between the neck 52 and grip handle 53 of the toothbrush. The flexible structure 51 comprises a region of "V" shaped folds 54, similar to that shown in FIGS. 1–9, formed by longitudinally adjacent pairs of limbs 54A and 54B which meet at 54C, each aligned at an acute angle to the longitudinal direction A—A to define an acute angled "V" shape between them with a fold axis C—C extending perpendicularly out of the plane of the drawing of FIG. 17. In the concavity or "bite" between the limbs 54A and 54B, and between the handle 53 and the limb of the fold 54 nearest the handle 53, and between the neck 52 and the limb 54 nearest the neck 52, is an elastomer material 55. As the region 51 bends under pressure experienced by the head of the toothbrush during toothbrushing the limbs 54A, 54B will compress the elastomer material 55 between them, and the elastomer material 55 will thereby resiliently resist the bending of the region 51.

The limbs 54A, 54B and the elastomer material 55 have a longitudinal guide groove 56 on both sides of the region 51, and which extends into the handle 53. A slider 57 is slideably mounted on each side of the toothbrush. Each slider 57 comprises a longitudinally extending arm which can engage with the flexible region 51 as it is moved longitudinally moved along the grooves 56 in a manner analogous to that described with reference to FIGS. 1–9. As the slider 57 moves toward the head of the toothbrush it engages the region 51 and progressively crosses a greater number of the limbs 54A, 54B and bridges a progressively greater number of "bites" between the limbs 54A, 544B, and the combination of the region 51 and slider 57 becomes progressively less flexible than the flexible region 51 alone.

An end stop abutment surface 58 limits the longitudinal movement of the slider 57 toward the head, and there are similar end-stop surfaces toward the other end of the groove 56 in the toothbrush handle 53.

Figure 18:
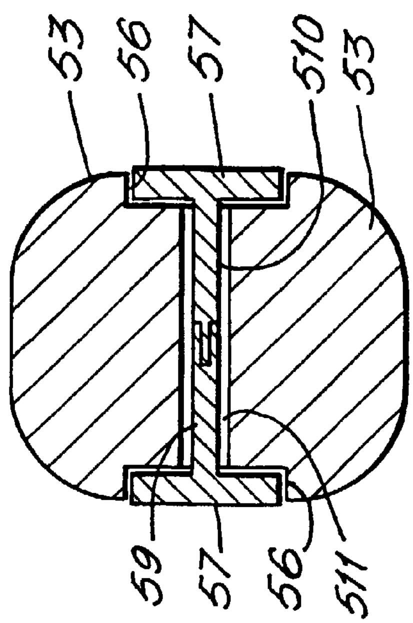
FIG. 18 is a cross-section of the toothbrush in FIG. 17 at G—G.

FIG. 18, a cross section through the toothbrush of FIG. 17 at line G—G shows how the two sliders 57, one on either side of the toothbrush, are connected by a link comprising two respective snap fit plug and socket connectors 59, 510, and which runs in a guide slot 511 passing through the toothbrush handle 53. The slot 511 runs longitudinally along within the toothbrush handle to guide the movement of the sliders 57. The sliders 57 and the link 59, 510 may frictionally engage with the surfaces of the toothbrush and slot 511 respectively to help to retain the sliders 57 in a selected longitudinal position. The guide grooves 56 and/or the slot 511 may have snap positions which enable the slider to snap into and be retained in a selected longitudinal position, e.g. corresponding to "soft, medium and hard". The slider 57 and parts of the toothbrush may have position indicators on them to indicate to the user which position is selected. The slider 57 may have a roughened surface to assist the user to grip and move the slider.

What is claimed is:

1. A toothbrush which has a head which carries a dental cleaning tool, and a grip handle, the head and handle being along a longitudinal head-handle direction, the implement has a resiliently flexible structure, which comprises a region of "U" or "V" shaped folds in the material of the toothbrush, situated in its handle or between its head and its handle, which can resiliently bend under the action of pressure experienced by the head during toothbrushing, wherein the toothbrush has adjustment means by which the user may alter the flexibility of the resiliently flexible structure between less and more flexible, the adjustment means comprising a longitudinally moveable stiffening member which is mounted externally on the flexible structure or on the handle or on the neck of the toothbrush longitudinally adjacent to the resiliently flexible structure and which can be moved longitudinally into greater or lesser engagement with the resiliently flexible structure, the resiliently flexible structure having one or more guides in its external surface and the stiffening member has one or more parts which can engage with the one or more guides and which can ride longitudinally along the one or more guide.

2. A toothbrush according to claim 1 wherein the resiliently flexible structure comprises a composite region of one or more relatively more flexible elastomer parts and one or more relatively less flexible plastic material parts.

3. A toothbrush according to claim 2 wherein the composite flexible structure comprises a region of "U" or "V" shaped folds in the material of the toothbrush, with an elastomer material in the concavity or "bite" between the limbs of the folds.

4. A toothbrush according to claim 1 wherein the stiffening member comprises one or more longitudinally extending arms, extending in the direction toward the head of the toothbrush, which can engage with the flexible structure.

5. A toothbrush according to claim 1 wherein the stiffening member is longitudinally slideable relative to the flexible structure.

6. A toothbrush according to claim 5 wherein a longitudinally slideable stiffening member is on each side of the toothbrush, the members being linked together to enable them to move together slideably along the toothbrush.

7. A toothbrush according to claim 1 wherein the resiliently flexible structure is a region of "U" shaped folds, the fold axes of the folds being aligned perpendicular or at an acute angle to the longitudinal axis and to the bristle direction; there is an elastomer material in the bite between the limbs of the folds; situated on the handle of the toothbrush is a longitudinally moveable slider; the flexible structure has one or more external longitudinal grooves; the stiffening member comprises one or more arms, which extends longitudinally toward the toothbrush head when the slider is on the handle, and the one or more arms engages with the one or more grooves when the slider is moved longitudinally toward the head.

8. A toothbrush according to claim 7 wherein the one or more arm is progressively moveable toward the toothbrush head to thereby cause the one or more arm to cross a progressively greater number of limbs of the "U" or "V" shaped folds, and to bridge a progressively greater number of the "bites" between adjacent limbs.

9. A toothbrush according to claim 1 wherein the stiffening member is moveable internally within the flexible structure.

10. A toothbrush according to claim 9 wherein the stiffening member is longitudinally moveable by a whole or partial screw thread action.

* * * * *